_United States Patent Office_

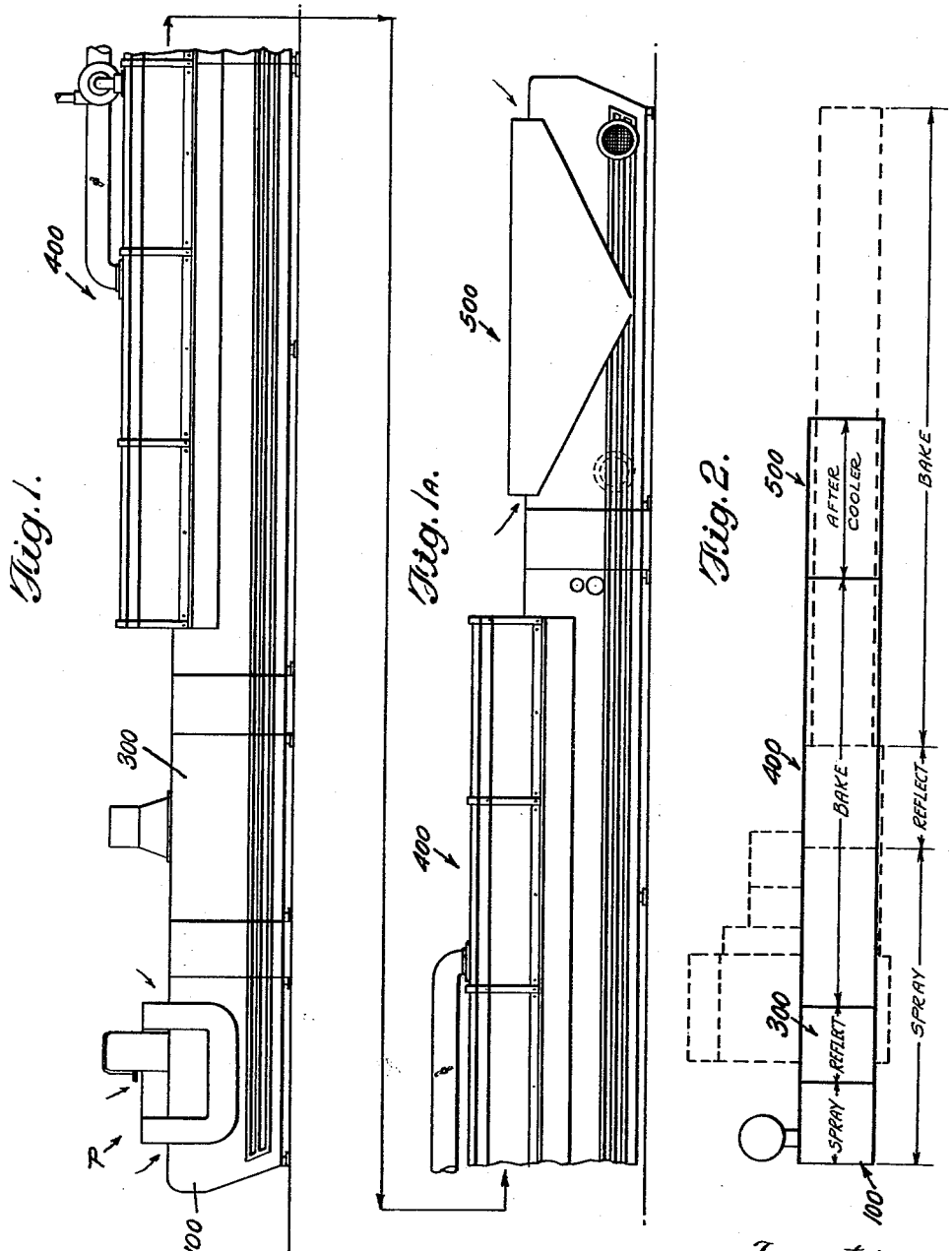

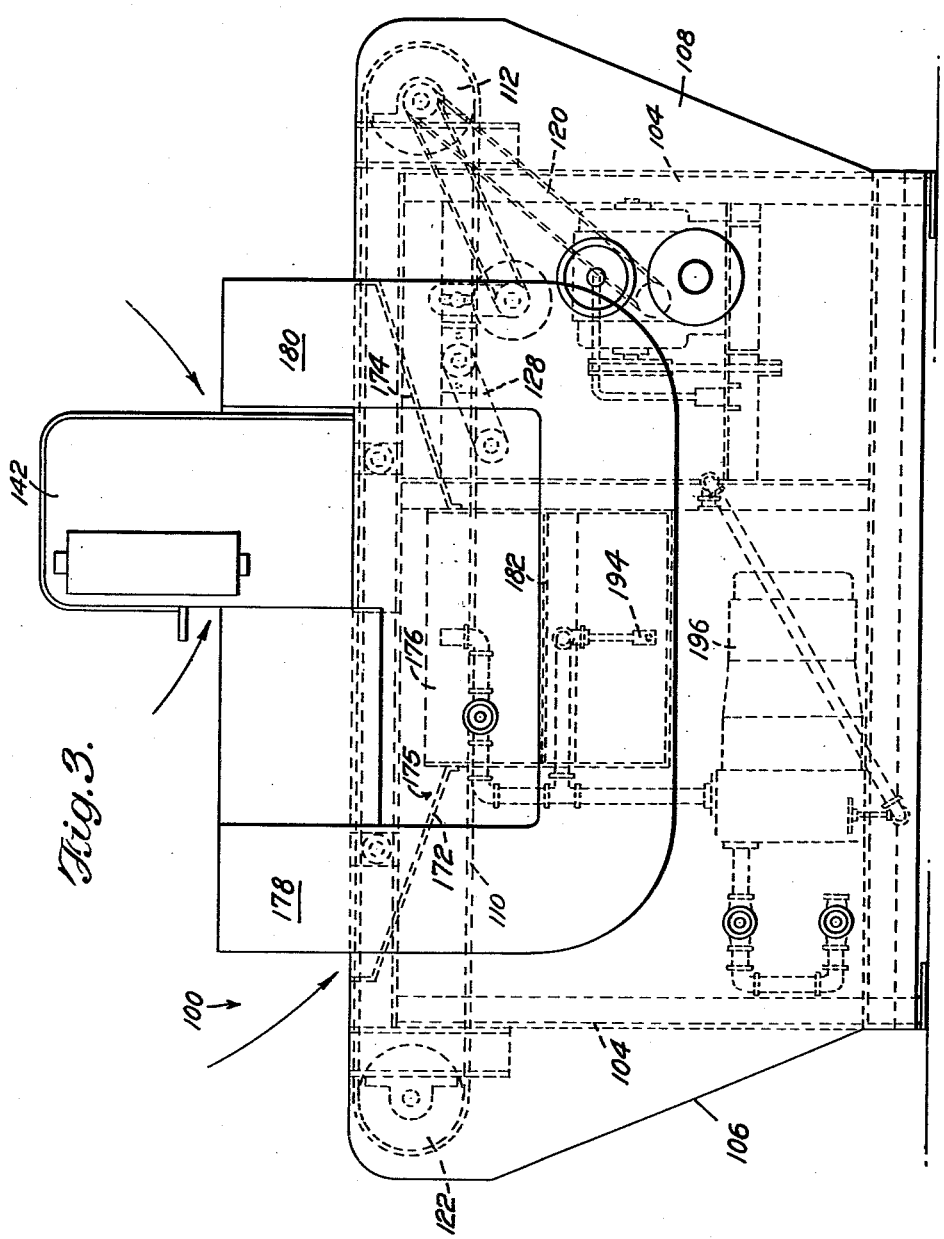

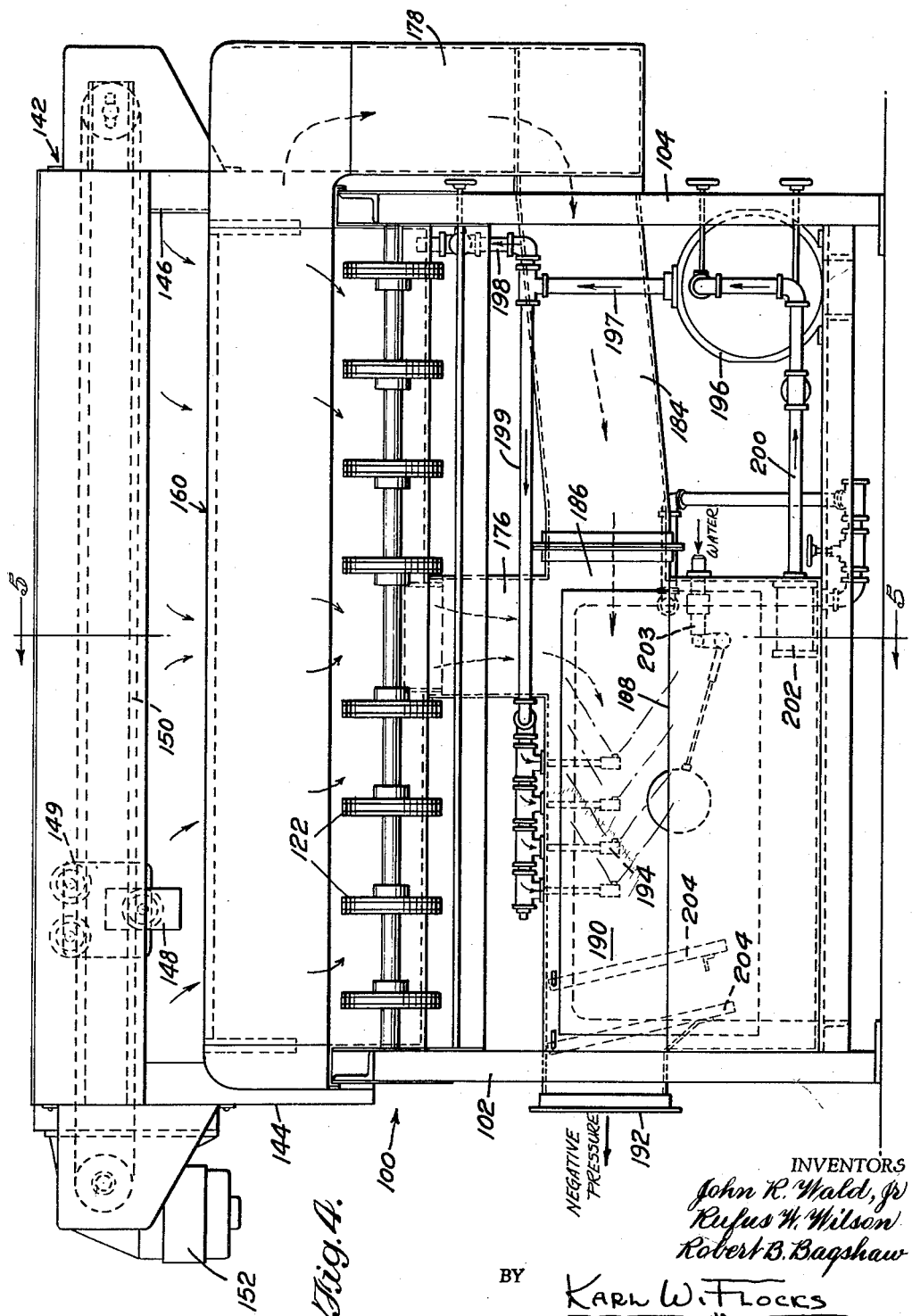

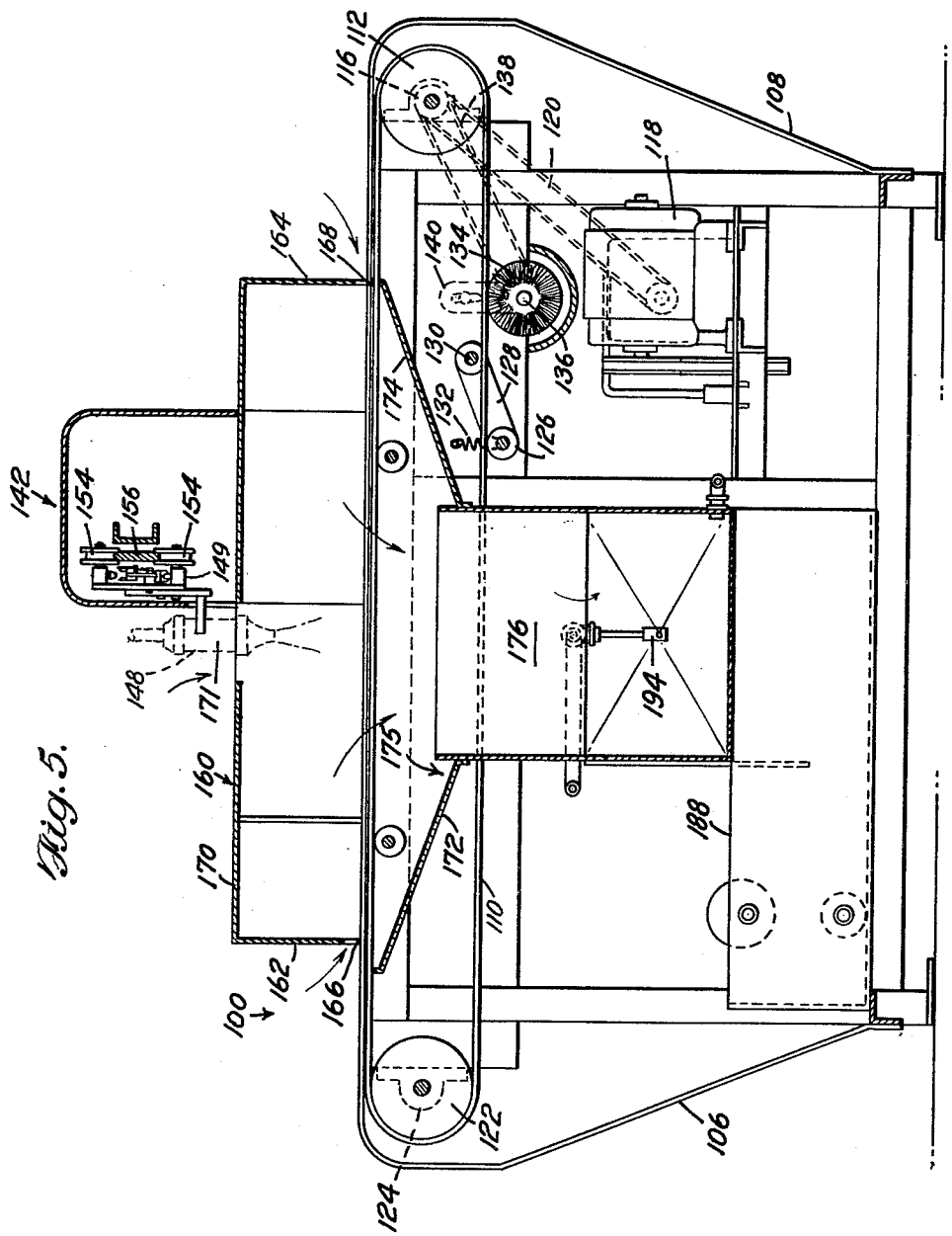

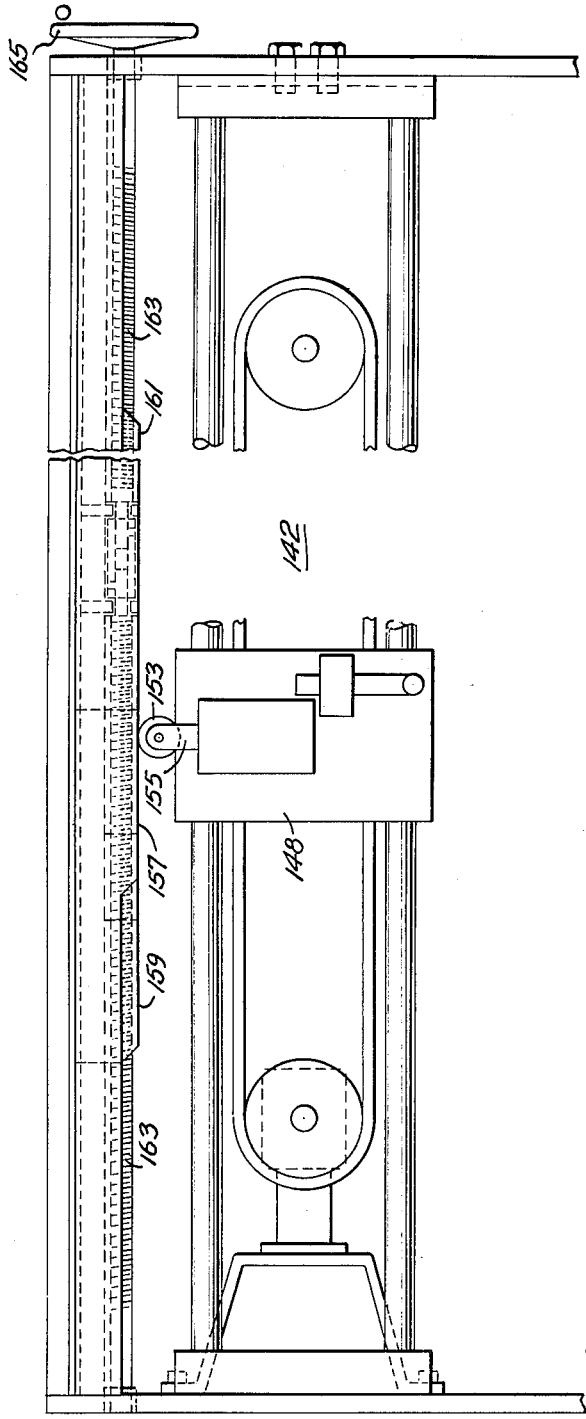

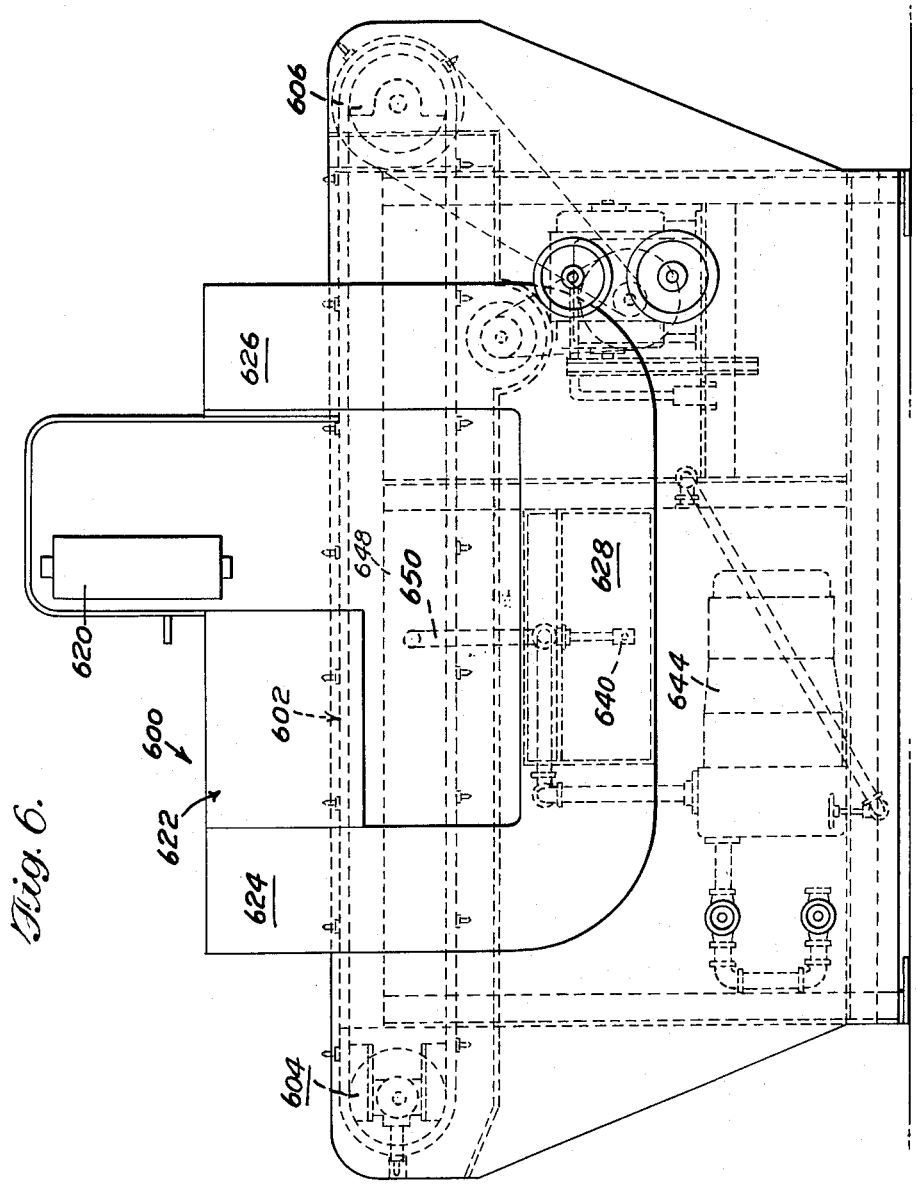

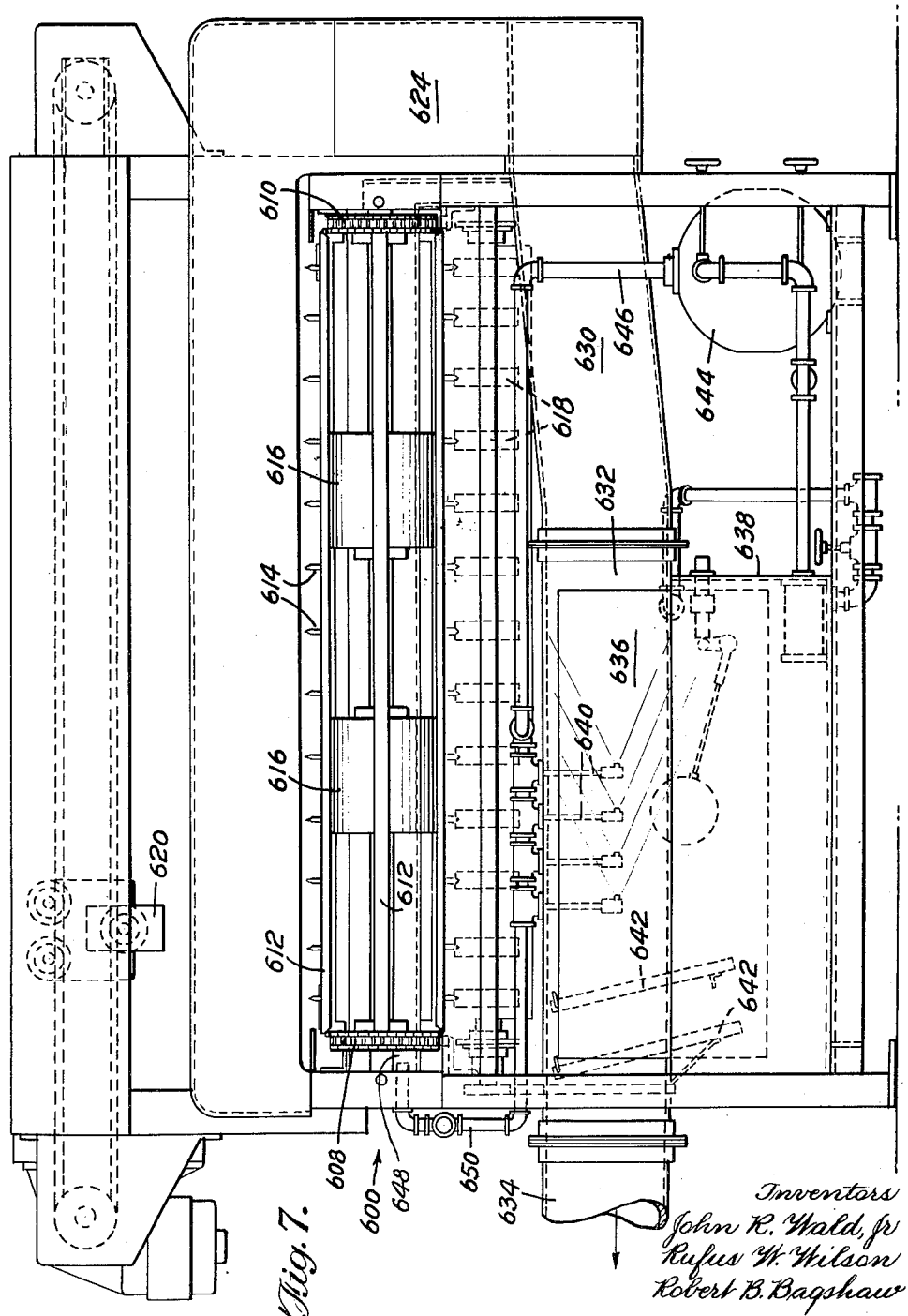

3,009,439
Patented Nov. 21, 1961

3,009,439
SPRAY COATING APPARATUS
John R. Wald, Jr., Rufus W. Wilson, and Robert B. Bagshaw, Huntingdon, Pa., assignors to Wald Industries, Inc., Huntingdon, Pa., a corporation of Pennsylvania
Filed Feb. 13, 1958, Ser. No. 715,114
6 Claims. (Cl. 118—324)

This invention relates to an apparatus and method for the continuous finishing of signs, license plates and the like, and more particularly to an apparatus and method for applying reflectorizing components to metal signs, license plates and the like and to thermally treating and to subsequently cooling the applied reflectorizing material. This application is a continuation-in-part of our previous application Serial Number 660,099, filed May 20, 1957, now abandoned.

In the manufacture of metal signs and license plates reflectorizing materials such as glass sphere reflectorizing components are applied to the surface of the signs. The application of such reflectorizing materials requires a preliminary application of a binder which may be sprayed or otherwise applied to the surface of the metal sign, after which the glass sphere or other reflectorizing components are applied to the surface having the binder applied thereon, the reflectorizing components being held in place by the binder. After the application of the reflectoring components or glass spheres to the binder-coated surface, the sign or license plate may then be baked.

Prior to the instant invention, apparatus for the application of binder-held reflectorizing material to metal surfaces has been very expensive, cumbersome and inefficient and has entailed the expenditure of large sums of money. The space occupied by such prior installations has been so large that they have not been utilized generally, it being considered impractical from a commercial point of view to utilize the installations of the prior art in those instances where economy of first cost and space are critical requirements.

A further disadvantage of the prior reflectorizing installations is that inadequate means are provided for collecting the unused binder material or binder mist which does not contact the work in such manner as to prevent this unused binder material from contacting the metal ducts and other portions of the reflectorizing apparatus. As a result of this inadequacy, the ducts and certain other portions of prior reflectorizing apparatus soon become clogged up and rendered inefficient or unusuable due to the precipitation thereon of the unused binder material.

Still another difficulty encountered in prior art reflectorizing apparatus is that a single conveyor has sometimes been used for carrying the work pieces past a spraying station and subsequently through a baking station. As a result, accumulations of binder from the spraying station have built up on the conveyor which cause a shut-down of the equipment.

Accordingly, it is an object of the instant invention to provide a coordinated and integrated sign reflectorizing apparatus occupying a minimum of longitudinal space and including an automatic binder spray and down-draft mist separating stage which may be combined with a controlled loader stage for dispensing the reflectorizing material, a zoned binder-baker stage, and a high-pressure after cooling stage.

It is another object of the instant invention to teach a novel apparatus and method for reflectorizing signs, license plates and the like at low first cost and low operational cost.

It is still another object of the instant invention to teach a novel organization of application stage components and thermal treatment stage components in a sign reflectorizing apparatus which results in a superior product capable of production at low cost and requiring only a minimum space allocation.

A further object of the instant invention is to provide a sign and license plate reflectorizing apparatus including means for separating the down-draft mist at the spraying station in such manner as to prevent the unused binder material from escaping into the atmosphere to cause the clogging and coating of portions of the reflectorizing apparatus.

Still a further object of the invention is to provide a reflectorizing apparatus in which at least two conveyors are used so as to provide a break in the conveyor system between the spraying and baking stages of the apparatus.

Other objects and the nature and advantages of the instant invention will be apparent from the following description taken in connection with the accompanying drawings wherein:

FIG. 1 and FIG. 1A are broken views in side elevation of the apparatus in accordance with the invention;

FIG. 2 is a schematic plan view schematically illustrating the apparatus shown in FIG. 1 and FIG. 1A in solid lines and other apparatus in dotted lines;

FIG. 3 is a view in side elevation of the automatic binder spray and down-draft separating stage of the apparatus in accordance with the invention;

FIG. 4 is a view in end elevation of the apparatus shown in FIG. 3 looking at the apparatus from its feeding end;

FIG. 5 is a view in longitudinal vertical section with parts shown in elevation taken along the line 5—5 of FIG. 4, and looking in the direction of the arrows;

FIG. 5A is a detailed view in end elevation of the spray head assembly, showing details of the spray width control means;

FIG. 6 is a view in side elevation similar to FIG. 3 but of a modified form of automatic binder spray and down-draft mist separating stage; and FIG. 7 is a view in end elevation similar to FIG. 4 but of a modified form corresponding to the form shown in FIG. 6.

Referring to the drawings, the automatic sign reflectorizing apparatus comprises a production line P including an automatic binder spray and down-draft mist separating stage 100 for the spray application of binder to the sign that is to be treated, and for the removal of mist and excess unused binder as will be hereinafter described, as used with a controlled loader stage 300 comprising a bead dispensing apparatus, zoned binder-baker stage 400, and a high-pressure after-cooling stage 500 for quickly bringing the finished product to handling temperature at the end of the production line.

As shown in FIGS. 3, 4, and 5, the binder spray and mist separating stage 100 includes a housing structure having longitudinally extending side wall panels 102 and 104, respectively, and end wall panels 106 and 108, respectively. End wall 106 is disposed adjacent the inlet end of stage 100 while end wall 108 is disposed adjacent the discharge end of stage 100. A conveyor system is provided which includes a plurality of endless wire ropes 110 extending around sheaves 112 on a drive shaft 116 which is driven by a motor 118 through a chain drive 120, and around sheaves 122 on an idler shaft 124 supported adjacent the end panel 106 at the inlet end of stage 100.

In order to insure proper tension on the wire ropes 110 at all times, see FIG. 5, the lower run of each wire rope 110 passes over an idler pulley 126 mounted on a lever arm 128 secured to a take-up shaft 130 supported between the oppositely disposed side panels 102 and 104 of stage 100. A spring 132 supported by a horizontal bar (not shown) biases each idler pulley 126 into engagement with its respective wire rope 110 at all times to thereby insure an adequate tension on each of the individual wire ropes.

In order that the wire ropes 110 may be maintained in clean condition, a rotary rope cleaning device such as rotary wire brush member 134 is supported in engagement with the underneath run of each wire rope 110. The plurality of rotary rope cleaning devices 134 are mounted on a shaft 136 which is rotatably driven by chain 138 from a sprocket mounted on drive shaft 116. The opposite ends of rope cleaner shaft 136 are supported by bracket members 140 which are vertically adjustable to permit adjustment of the position of the rope cleaning members 134 relative to the wire ropes 110.

A spray head assembly generally indicated at 142 is positioned above the walls 102—104—106—108 defining the cabinet structure of stage 100 and is supported intermediate the length of stage 100 by vertical bracket members 144—146 which are connected to the upper ends of the longitudinally extending walls 102 and 104. A traversing spray gun 148 carried by a carriage 149 is mounted on the spray head assembly and is reciprocated in a direction laterally of the path of travel of wire ropes 110 by an endless V-belt 150 driven by a motor 152. Stop members (not shown in the drawing) are provided at opposite ends of the reciprocating path of travel of spray gun 148 and when engaged by the spray gun carriage 149 actuate suitable mechanism on the spray gun carriage to cause the spray gun carriage to reverse its direction of movement by connecting itself in driving relation to an opposite run of V-belt 150. Spray gun carriage 149 includes sheaves 154 at its upper and lower ends which move along a guide track 156 rigidly mounted on the cabinet structure.

An important feature of the automatic binder spray and down-draft mist separating stage 100 is the provision of structure which traps or precipitates entrained mist containing binder which does not contact the work pieces. One important component of the down-draft mist portion of stage 100 is the exhaust hood assembly generally indicated at 160 which is a generally hollow box-like structure including laterally extending vertical walls 162 and 164, respectively (FIG. 5), facing the inlet and discharge ends, respectively, of stage 100, and including passages 166 and 168 through which the air is admitted and through which the work pieces carried by wire ropes 110 may pass.

In operation, carriage 149 and spray gun 148 make a complete stroke laterally of the conveyor on which the work pieces are supported, independently of the width of the work being processed. However, means are provided for adjusting the portion of the stroke in which the spray gun 148 operates to spray the binder on the work pieces.

As shown in FIG. 5A, spray gun carriage 148 carries at its upper end a roller 153 mounted on arm 155 which controls the opening of the spray gun valve. Arm 155 is spring-biased to a raised position in which the spray gun valve is closed. In order to control the opening of the spray gun valve by moving arm 155 downwardly against its spring bias, stationary cam means are provided directly above the path of movement of roller 153. The cam means includes a fixed cam 157 and two movable cam segments 159 and 161. The length of fixed cam 157 laterally of the conveyor corresponds to the minimum width of spray desired. Movable cam segments 159 and 161 are in threaded engagement with a shaft 163 which is suitably supported by the spray head assembly 142. The respective cam segments 159 and 161 are threaded with opposite-handed threads so as to cause the two cam segments to move in opposite directions when shaft 163 is turned. Shaft 163 is turned by means of handwheel 165 to either retract cam segments 159 and 161 to a position in which they lie behind fixed cam 157, or to a position in which they extend beyond the opposite ends of fixed cam 157 to any desired extent.

The combined effective lateral width of fixed cam 157 and the two adjustable cam segments 159 and 161 determine the length of the spraying stroke since engagement of roller 153 with any of the cams 157, 159, 161 is effective to open the valve of the spray gun.

Vertical walls 162 and 164 are joined at their upper ends by a horizontal wall 170 containing a passage 171 through which the nozzle of the spray gun projects and through which air is also admitted. Walls 162, 164 and 170 of the exhaust hood assembly all lie above the plane of movement of the upper run of wire ropes 110. The lower portion of the exhaust hood is defined by downwardly inclined walls 172 and 174 which are connected to the upper end of a vertically extending exhaust duct 176 best seen in FIGS. 4 and 5. Walls 172 and 174 are suitably joined together by longitudinally extending side wall portions.

The downwardly inclined walls 172 and 174 and the connecting side wall portions therebetween form a tray generally indicated at 175 through which water is continuously circulated by a high pressure pump 196 as will be hereinafter more fully described. Pump 196 has a discharge line 197 having a branch discharge line 198 which is connected to water tray 175. The water from tray 175 spills over into vertical duct 176 from which it passes to a sump tank to be hereinafter described.

A substantial proportion of the binder mist which does not contact the workpieces is trapped in the water bath of tray 175.

On one side of the exhaust hood, the vertical end walls 162 and 164 are joined by a suitable longitudinally extending side wall to form a closure between these two end walls while on the opposite side of the exhaust housing adjacent longitudinal wall 104 of stage 100, two external vertical ducts 178 and 180 (FIG. 3) provide air communication between the opposite ends of the upper portion of the exhaust hood 160 and internal vertical duct 176. The two external vertical ducts 178 and 180 are joined together at their lower ends by a longitudinally extending duct portion 182 which, in turn, is connected to the lower end of internal vertical duct 176 by a laterally extending duct 184 which extends interiorly of the cabinet structure. The lower end of internal vertical duct 176 and the inner end of lateral duct 184 are connected to a duct 186 which forms a continuation of duct 184. Duct 186 defines a spray chamber in which binder mist is precipitated from the exhaust air as will be more fully described. Duct 186 is open on its underneath surface so as to communicate with a sump tank 188 positioned below it. Duct 186 is also open on its side, this opening being normally closed by a removable panel 190.

A source of negative air pressure is applied to the exhaust hood system at the outlet 192 of the spray chamber formed by duct 186. Thus, air passing into the upper level of exhaust hood 160 through the inlet passages 166, 168 and 171 is directed downwardly by the bottom walls 172 and 174 at the lower end of exhaust hood into the upper end of internal vertical duct 176 and thence passes to duct 186. Another passage for the air from exhaust hood 160 is provided by the vertical ducts 178 and 180 which communicate through duct portions 182 and 184 with spray chamber duct 186. The exhaust air coming through the ducts 176 and 184 all converges together into the spraying chamber defined by duct 186.

Supplementing the washing action of the water in water tray 175 and to remove from the exhaust air any entrained binder material in mist form not removed by the action of water tray 175 before the exhaust air escapes to the atmosphere, an air washing apparatus is provided as hereinafter described. A plurality of spray pipes 194 which are connected through conduit 199 to the discharge line 197 of high pressure pump 196 provide a water spray. Pump 196 also supplies water to water tray 175 as previously explained. Spray pipes 194 extend downwardly through the upper surface of duct 186 to the interior thereof directly into the path of exhaust air coming from ducts 176 and 184. The water discharged from spray pipes 194 falls into sump tank 188 which is positioned beneath the elongated opening in the lower wall of duct 186. Sump tank 188 is connected at its lower end through a suitable filter 202 to the inlet line 200 of pump 196. Thus, the high pressure pump 196 provides a continuous circulation of water to spray pipes 194, the water passing to sump tank 188 and back to pump 194 through inlet pipe 200. The water in sump tank 188 is maintained at a predetermined level by a float operated valve 203 which controls admission of water to the circulating system to compensate for losses due to evaporation.

To additionally assist in the precipitation of binder material from the exhaust mist, baffles 204 are positioned in the path of exhaust air through duct 186. Baffles 204 extend from the upper end of duct 186 to beneath the normal water level in sump tank 188 and provide an obstruction in the path of air flow through duct 186 beyond water spray pipes 194 which causes the air to pass through the water in sump tank 188 before escaping to the outlet end 192 of duct 186. Thus, the down draft air passing through exhaust hood 160 passes into contact with the water in water tray 175, then is washed by the water from spray pipes 194, and is finally washed by passage through the water in sump tank 188 in the region of baffles 204. The air which finally passes through outlet opening 192 has had substantially all of the entrained binder material separated therefrom and passes into the atmosphere surrounding the apparatus in a clean condition.

The location of the water tray and spray entirely within the first stage is critical insofar as space saving is concerned and also with respect to the substantial elimination of maintenance problems and fire hazards.

As shown in FIGS. 6 and 7, a modified spraying and down draft mist separating stage, generally indicated at 600, includes a cabinet structure which supports a moving conveyor 602 which carries the workpieces through the spraying stage. Conveyor 602 is of somewhat modified construction from that used in spraying stage 100 previously described and includes on either side thereof a pair of longitudinally extending chains 608 and 610 which pass around idler sprockets 604 at the input or loading end of the stage, and around drive sprockets 606 at the delivery end of the stage. Conveyor 602 includes a plurality of laterally extending cross strip members such as those indicated at 612 and which extend between the oppositely disposed chains 608 and 610 of the conveyor. Each of the cross strip members 612 carries thereon a plurality of spike-like members 614 which support the workpieces. The conveyor passes around drums such as those indicated at 616 at opposite ends of the conveyor. In order to maintain the spike members clean, rotary brush members 618 corresponding to each of the rows of spike members are driven by a suitable power take-off from the main drive motor which drives the conveyor.

A spray head assembly generally indicated at 620 is positioned above the cabinet structure and above the path of conveyor 602 and is substantially similar to the spray head assembly described in connection with the spraying stage 100.

An exhaust hood assembly 622 is positioned above the path of travel of conveyor 602 and extends for the entire lateral width of the conveyor both forwardly and rearwardly of the spray head assembly. The exhaust hood 622 is provided with openings which permit the conveyor and the workpieces supported thereon to pass through the exhaust hood and beneath the spray head assembly, but otherwise the exhaust hood substantially completely encloses the space above the path of the conveyor for a substantial distance from the spray head assembly toward the input end of the stage and for a somewhat shorter distance from the spray head assembly toward the output end of the stage. At each end of the exhaust hood 622 on one lateral side thereof are connected vertical ducts 624 and 626, respectively, which communicate with the interior of the exhaust hood adjacent the input and output ends, respectively, of the exhaust hood, with reference to the direction of movement of the conveyor and of the workpieces supported thereon.

Vertical ducts 624 and 626 are connected to each other at their lower ends by a cross duct portion 628 and a laterally extending duct member 630 communicates with duct portion 628 intermediate the length thereof and substantially centrally of the length of stage 600. Duct 630 extends into communication with a spraying chamber defined by a duct 632 connected to a source of negative pressure at its outer end 634. Duct 632 has a side opening which is covered by a removable panel 636, and is also open on its underneath surface to communicate with a sump tank 638 positioned beneath duct 632.

Spray pipes 640 extend downwardly into the interior of duct 632 and spray the air passing through the duct in such manner as to precipitate any pigments or binder material into sump tank 638. Baffle members are positioned in the path of the mist-laden air in such manner as to force the air downwardly through the water bath in sump tank 638 before it passes outwardly through the outlet opening 634 of duct 632 to the source of negative pressure. A high pressure pump 644 supplies water to spray pipes 640 through discharge pipe 646 of the pump.

To additionally aid in the precipitation of the unused binder mist from the air, a water pan 648 is positioned between the upper and lower runs of conveyor 602, water pan 648 extending longitudinally of the conveyor for substantially the entire distance between idler sprocket 604 and drive sprocket 606 and extending laterally of the conveyor for the entire width thereof. Water pan 648 is continuously supplied with water through pipe 650 which is connected to discharge pipe 646 of pump 644. A suitable drain connection is provided between water pan 648 and sump tank 638.

*Summary of operation*

The operation of the embodiment of FIGS. 1–5A is hereinafter described. The metal workpieces, such as license plates or signs, which are to be coated with a reflectorizing material, are positioned on the wire ropes 110 which form the conveyor of spraying and down draft mist separating stage 100. The workpieces are moved by wire ropes 110 through passage 166 of exhaust hood 160. Spray gun 148 projects downwardly into the interior of the exhaust hood above the surface of the workpieces and is traversed in a lateral direction by motor driven belt 150 to spray a suitable binder liquid to a controlled thickness onto the surface of the workpieces. The binder liquid includes not only pigment and solvent but also a resin of the thermosetting type such as phenol formaldehyde. The resin in the binder liquid is in the "A" phase at stage 100.

A down draft is provided through exhaust hood 160 to cause any unused binder mist to be drawn downwardly through the centrally located vertical exhaust duct 176 at the lower end of the exhaust hood and through the external vertical exhaust ducts 178 and 180 into communication with duct 186 which defines the spraying chamber. The portion of the exhaust air passing into vertical exhaust duct 176 also passes into proximity to the water in water pan 175 defined by the sloping bottom walls 172 and 174 of exhaust hood 160. All of the exhaust air, including that which passes through external vertical exhaust ducts 178 and 180 and also the air which passes through internal vertical duct 176 passes through the spray chamber formed by duct 186. Water from spray pipes 194 sprays the mist-laden air passing through duct 186 to precipitate binder mist into sump tank 188. The washed air passing spray pipes 194 must also pass downwardly through the water in sump tank 188 in order to get around baffle members 204. Thus, some of the down draft air is subject to the precipitating action of the water in water pan 175 to aid in removing binder mist from the air, while all of the exhaust air must pass by the water spray pipes 194 and pass the baffles 204 before emerging from outlet end 192 of duct 186. The air which emerges from outlet end 192 has been subjected to a thorough cleaning action and substantially all of the entrained binder material has been removed therefrom so that the air as it is discharged in the vicinity of the reflectorizing apparatus does not clog or adhere as a coating on portions of the apparatus in such manner as to adversely affect the operation of the apparatus.

After the workpieces have passed through the outlet passage 168 of exhaust hood 160, they are picked up by a conveyor of loading stage 300. Loading station 300 is positioned in close juxtaposition to the spraying and down draft mist separating stage 100 so that the resinous binder coating is still in the "A" phase when it reaches loading stage 300, causing the glass bead reflectorizing elements to become adhesively attached to the binder coating.

After the workpieces have received a coating of reflectorizing elements, they are delivered to the conveyor of the binder-baker stage 400.

After emerging from the last oven unit 420, the metal workpieces with the resinous coating thereon in a cured condition, are now passed onto the after-cooler stage 500, where the hot metal workpieces are quickly cooled to a temperature at which they may be manually handled.

The operation of the modified spraying and down draft mist separating station shown in FIGS. 6 and 7 is generally similar to that described in connection with that of the similar stage 100 of the embodiment of FIGS. 1–5A, inclusive. In the modified embodiment of FIGS. 6 and 7, the metal workpieces are carried by a conveyor 602 beneath an exhaust hood 622 where a traversing spray gun assembly 620 sprays a controlled amount of resinous binder material onto the upper face of the workpieces. The mist-laden air is removed from the exhaust hood 622 through vertical ducts 624 and 626 which connect with each other through duct 628, the exhaust air then passing through lateral duct 630 into communication with duct 632 which defines the spraying chamber. The exhaust air passing into duct 632 is sprayed by water spray pipes 640 and is also passed through the water sump tank 638 due to the action of the deflector elements 642 in a manner generally similar to that described in connection with the embodiment of FIGS. 1–5A. The mist-laden air beneath the exhaust hood 622 of the embodiment of FIGS. 6–7 is also subjected to the precipitating action of a water pan 648 positioned between the upper and lower runs of conveyor 602. Unlike the embodiment of FIGS. 1–5A, the embodiment of FIGS. 6–7 does not include a centrally located vertical duct such as duct 176 shown in FIG. 5 through which exhaust air may pass to the spraying chamber. Instead, all of the exhaust air must pass to the spraying chamber through the vertical ducts 624 and 626 and the ducts 628 and 630 to which these vertical ducts are connected and no internal centrally located vertical duct corresponding to duct 176 shown in FIG. 5 is provided in this modified embodiment.

It can be seen from the foregoing that there is provided in accordance with this invention a coordinated and integrated sign reflectorizing apparatus occupying a minimum longitudinal space and including in cooperative relation an automatic binder spray and down draft mist separating stage which may be used with a controlled loader stage for dispensing the reflectorizing material, a zoned binder-baker stage, and a high pressure after-cooling stage. The apparatus of the invention permits metal workpieces such as signs, license plates and the like to be reflectorized at a low first cost and at a low operational cost, providing at the same time a superior product having a controlled binder coating thickness and a controlled distribution of reflectorizing elements embedded in the binder coating.

The apparatus of the invention includes a spraying stage and down draft mist separating stage so constructed as to precipitate any unused binder material from the air within the spraying stage, to thereby prevent the unused binder material from clogging and coating portions of the reflectorizing apparatus so as to interfere with the proper operation of the apparatus.

It will be obvious to those skilled in the art that various changes may be made without departing from the spirit of the invention and therefore the invention is not limited to what is shown in the drawings and described in the specification but only as indicated in the appended claims.

What is claimed is:

1. An apparatus for applying coatings to metal workpieces such as signs and the like, comprising a conveyor means, a binder spray generating element located above the workpieces to be treated, a water tray located directly below said conveyor means which moves the workpieces to be treated and in the direct path of excess binder passing beneath said conveyor means, means for keeping said water tray covered with water whereby excess binder will be received by the water in said tray, said apparatus including an opening adjacent said water tray through which air may pass to a space below said tray, means for creating a negative pressure about said spray generating element and in the space below said tray so as to cause a down-draft of the mist about the tray, and means for washing the mist including a water spray located below said water tray.

2. An apparatus for applying coatings to metal workpieces such as signs and the like, comprising a conveyor, an exhaust hood, said exhaust hood being apertured intermediate its height to permit passage of said conveyor and the workpieces carried thereby, a spray generating element extending into said exhaust hood above the workpieces for spraying a binder onto the surface of said workpieces, means for creating a negative pressure in said exhaust hood to cause a down-draft of the mist about the spray, and water bath means beneath said conveyor and in the direct path of mist through said exhaust hood for precipitating entrained binder from the mist.

3. An apparatus for applying coatings to metal workpieces such as signs and the like comprising a conveyor, an exhaust hood apertured intermediate its height to permit passage therethrough of said conveyor and the workpieces carried thereby, a spray generating element extending into said exhaust hood above the workpieces for spraying a binder onto the surface of said workpieces, means for creating a negative pressure in said exhaust hood to cause a down-draft of the mist about the spray, a water tray position in said exhaust hood directly beneath the conveyor and in the direct path of excess binder passing beneath said conveyor, means for keeping said water tray covered with water whereby excess binder will be received by the water in said tray, said apparatus including an opening adjacent said tray through which air and mist may pass toward a discharge opening of said exhaust hood, and a water spray for washing the mist, said water spray being located beyond said water tray in the path of mist through said exhaust hood.

4. The apparatus of claim 3, said tray having an opening through an intermediate part thereof, a duct from said opening adjacent said tray to said discharge opening in said exhaust hood, and a second duct from said opening through said tray and connected with said first mentioned duct, said water spray being in said first mentioned duct down stream of the juncture of said ducts.

5. The apparatus of claim 4, and a sump tank extending from the bottom of said first mentioned duct downstream of said juncture, and beneath said water spray.

6. The apparatus of claim 3, further including baffle means extending across a duct and into a sump tank in the path of mist toward the discharge opening of said exhaust hood.

References Cited in the file of this patent

UNITED STATES PATENTS

| | | |
|---|---|---|
| 1,266,669 | Eberhart | May 21, 1918 |
| 1,785,322 | McQuiston | Dec. 16, 1930 |
| 1,812,854 | Beach | July 7, 1931 |
| 1,827,876 | Lang | Oct. 20, 1931 |
| 1,870,041 | Dike | Aug. 2, 1932 |
| 1,998,055 | McBurney et al. | Apr. 16, 1935 |
| 2,049,535 | Benner et al. | Aug. 4, 1936 |
| 2,119,910 | Ferry | June 7, 1938 |
| 2,143,946 | Hunter | Jan. 17, 1939 |
| 2,227,465 | Roche et al. | Jan. 7, 1941 |
| 2,259,626 | Erikson | Oct. 21, 1941 |
| 2,303,202 | Faris et al. | Nov. 24, 1942 |
| 2,343,906 | Huthersall et al. | Mar. 14, 1944 |
| 2,412,138 | Fink | Dec. 3, 1946 |
| 2,496,070 | Selsky | Jan. 31, 1950 |
| 2,557,561 | Powers | June 19, 1951 |
| 2,610,605 | Paasche | Sept. 16, 1952 |
| 2,661,303 | Fasold et al. | Dec. 1, 1953 |
| 2,714,870 | Giraudo | Aug. 9, 1955 |
| 2,728,238 | Paasche | Dec. 27, 1955 |
| 2,732,883 | Morrison et al. | Jan. 31, 1956 |
| 2,772,186 | Mollers et al. | Nov. 27, 1956 |
| 2,777,419 | Paasche | Jan. 15, 1957 |
| 2,870,739 | Rodli | Jan. 27, 1959 |
| 2,889,806 | Conant | June 9, 1959 |